United States Patent
Robbins

(10) Patent No.: US 6,588,702 B2
(45) Date of Patent: Jul. 8, 2003

(54) LIGHTER-THAN-AIR DEVICE HAVING A FLEXIBLE USABLE SURFACE

(76) Inventor: Albert Harold Robbins, 5543 Old Colony Rd., Indianapolis, IN (US) 46226

( * ) Notice: Subject to any disclaimer, the term of this patent is extended or adjusted under 35 U.S.C. 154(b) by 0 days.

(21) Appl. No.: 10/028,736

(22) Filed: Dec. 28, 2001

(65) Prior Publication Data

US 2002/0113166 A1 Aug. 22, 2002

Related U.S. Application Data

(60) Provisional application No. 60/258,524, filed on Dec. 29, 2000, and provisional application No. 60/304,736, filed on Jul. 13, 2001.

(51) Int. Cl.$^7$ .................................................. F41J 9/08
(52) U.S. Cl. ............................................. 244/31; 244/33
(58) Field of Search .......................... 244/30, 31, 24, 244/33; 135/90

(56) References Cited

U.S. PATENT DOCUMENTS

| | | | | |
|---|---|---|---|---|
| 605,438 A | * | 6/1898 | Koehler | 244/31 |
| 3,773,279 A | * | 11/1973 | Wright | 244/31 |
| 3,941,384 A | * | 3/1976 | Wopschall | 273/386 |
| 5,464,034 A | * | 11/1995 | Kestin | 135/90 |
| 5,853,147 A | * | 12/1998 | Reinhard | 244/31 |

FOREIGN PATENT DOCUMENTS

EP    0401891 A1 * 12/1990    ............. B64B/1/44

* cited by examiner

*Primary Examiner*—Charles T. Jordan
*Assistant Examiner*—Timothy D. Collins
(74) *Attorney, Agent, or Firm*—Thomas D. Robbins

(57) ABSTRACT

A lighter-than-air device comprises a buoyant element containing lighter-than-air gas, and a flexible surface having a length and height forming a usable area. The flexible surface has a bottom edge that is not connected to the buoyant element. The length of the flexible surface is connected directly to the buoyant element. The flexible surface is operable to use an area defined by the buoyant element and the bottom edge of the flexible surface to, among other things, condense water, move a vessel, and block material from entering an area.

2 Claims, 7 Drawing Sheets

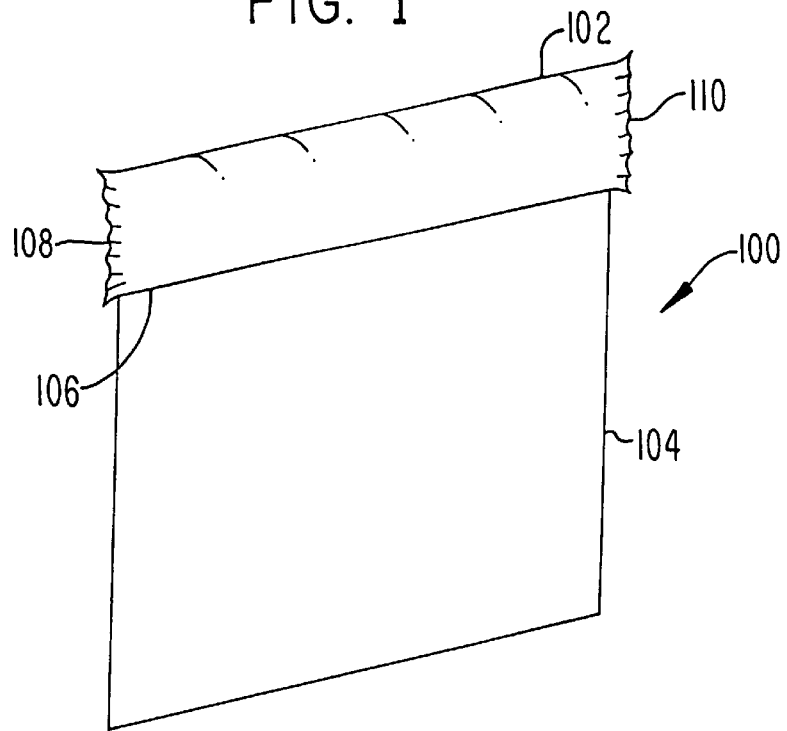
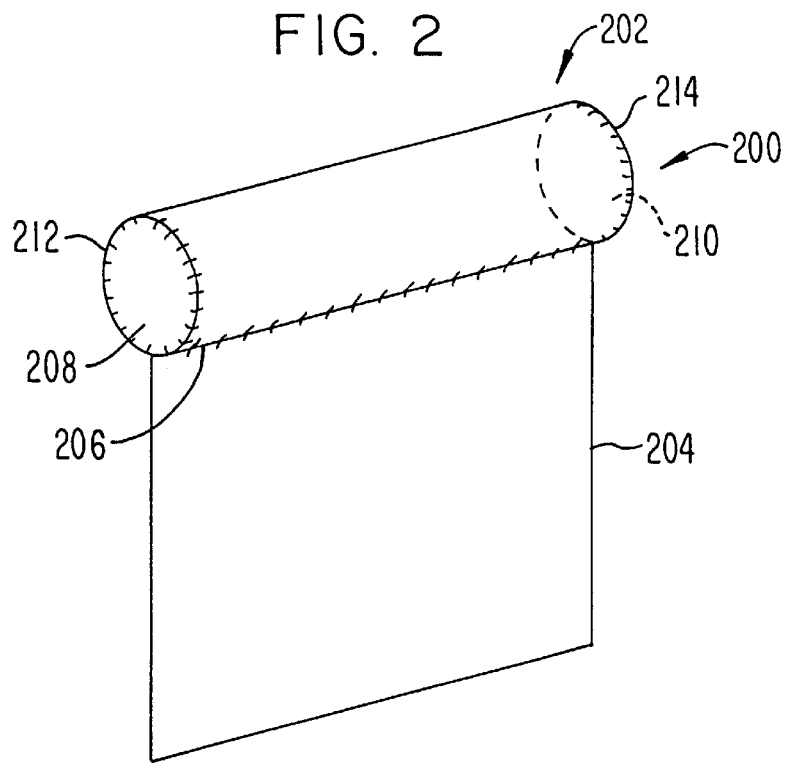

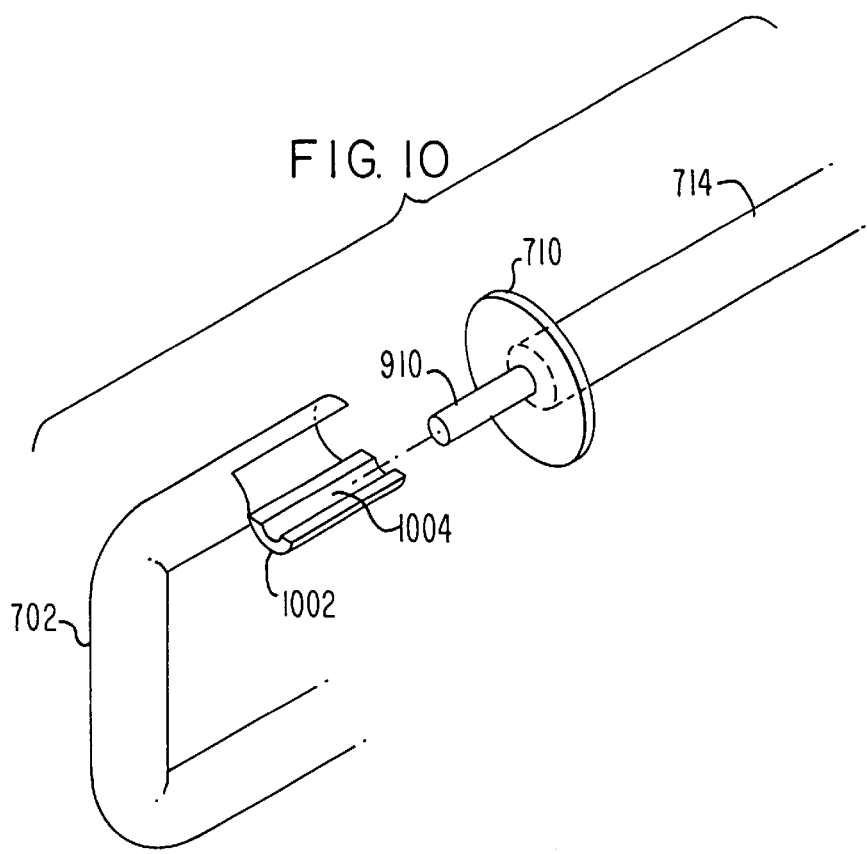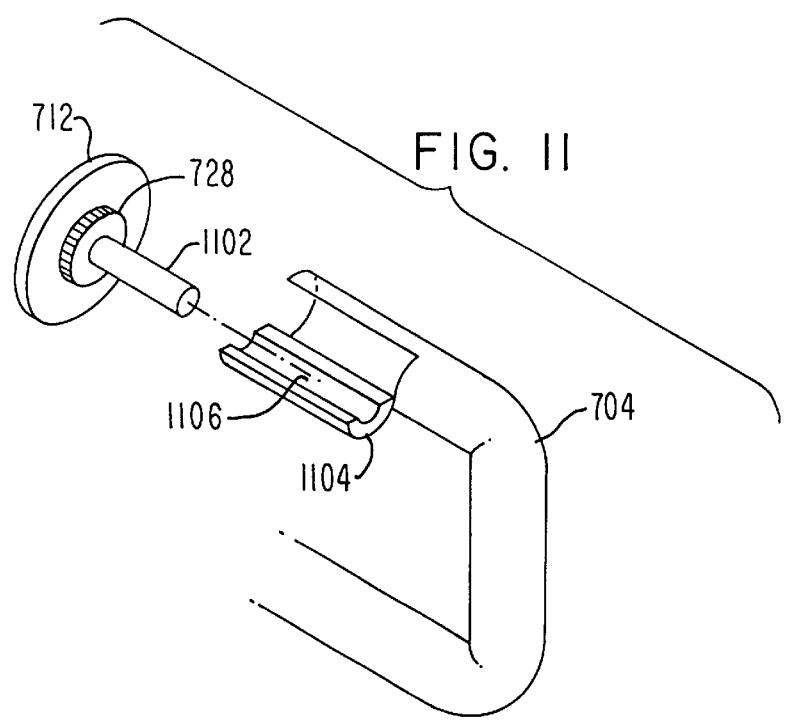

LIGHTER-THAN-AIR DEVICE HAVING A FLEXIBLE USABLE SURFACE

This application claims the benefit of U.S. Provisional Application No. 60/258,524, filed Dec. 29, 2000, and U.S. Provisional Application No. 60/304,736, filed Jul. 13, 2001, the entire disclosures of which are incorporated herein by reference.

FIELD OF INVENTION

The present invention is generally drawn to lighter-than-air ("LTA") devices and respective uses thereof.

BACKGROUND OF THE INVENTION

Although there are many examples of connections between the ground and LTA devices, the barrage balloon is the only reported example of an LTA device designed primarily to control the space beneath itself. The barrage balloon was designed to damage or destroy an airplane that flew into the cable between the balloon and the ground. Today Federal Aviation Agency regulations require posting a NOTAM (Notice to Airmen) in addition to marking the aerostat or tethered balloon's tether cable whenever flown, to prevent its unintentionally serving as a barrage balloon.

An LTA device remains airborne because it consists primarily of a buoyant gas, such as hot air or some other gas which weighs less than the air that it displaces. For example: Under Standard Sea-level temperature and pressure conditions, one thousand cubic feet of helium displaces one thousand cubic feet of air, thus providing roughly 64 pounds of lifting force.

Non-limiting examples of buoyant gases to be used in LTA devices include hydrogen, helium, methane, and pipeline gas (natural gas). Hydrogen provides the most lift, but is highly flammable. Helium, which is not flammable, provides nearly as much lift as hydrogen, but is much more expensive than hydrogen. Methane is nearly half as effective a lifting gas as helium, but also is flammable. Natural Gas, because of heavy impurities, is slightly less effective than pure methane, but is widely available and very inexpensive compared to hydrogen, helium or methane.

Accordingly, a 10-foot diameter sphere provides a gross lift of approximately 270 pounds if filled with helium. Although a sphere is the most efficient container, enclosing the greatest volume with the least surface area, conventional balloon construction techniques require many panels and consequently many heavy seams. Thus, the fabric in a spherical balloon may weigh as much as a simple cylindrical balloon of equal volume, but with fewer seams.

Nineteenth century aeronauts invested a great deal of effort developing techniques using one or more appendages to provide the pilot some control over his balloon with respect to the prevailing wind and to take advantage of ocean or river currents. They repeatedly demonstrated that sails could be effectively employed to provide directional control if the balloon moved significantly slower than the relative wind. (Example: AIRSHIPS PAST AND PRESENT, Hildebrandt, A., Van Nostrand Co, New York, 1908. The first attempt to reach the North Pole by balloon (Andre's Red Balloon) combined the use of a balloon mounted sail, and a weighted line which dragged in the water or over the ice.)

With the introduction of the internal combustion engine, aeronauts were finally able to move independent of the wind. However, their airship's speed was limited both by propulsive power and by the effect of dynamic air pressure on the envelope and the airship appendages Conventional airships are still limited to roughly 80 miles per hour, with normal "cruising" speeds in the 30 to 40 mph range.

Other problems associated with conventional airships deal with changes in air temperature, pressure, and the effects of condensation and precipitation. Specifically, while traveling through fog, or more generally clouds, condensation accumulates on the surface of the envelope. Such accumulation over the large surface area of the airship adds undesirable weight to the envelope, thereby adversely affecting the airship's efficiency. In extreme cases, large amounts of water accumulation may be detrimental to the flight of the airship. Most airship designs incorporate features to prevent the dripping water from interfering with pilot visibility and to prevent ice thrown from the propeller blades from damaging the envelope. It was common military practice to fly into a summer shower near the end of a mission, primarily to cool the gas in order to bring the airship back to neutral buoyancy, and secondarily to wash the envelope. Since most flights were over-water, pilots found it more effective to use a winch to pick up ballast water when needed, rather than to hunt for rain, During the first century of manned flight, balloons were normally inflated shortly before launching, and the envelope collapsed by releasing the gas at the end of the flight, in the same manner as the present-day hot-air balloons and airships. Because of the cost and complexity of rigging cold-gas airships, Santos-Dumont developed the hangar and other techniques for maintaining an inflated airship between flights.

Various techniques were developed, using one or more lines for ground handling, recovery, controlling and anchoring balloons and airships. During World War I, British, Italian, and other airship operators developed multi-point high-moors; the airship was commonly tethered thirty feet in the air. Alternatively, airships were "bedded down"; tethered closely to the ground and protected by natural or manmade windbreaks or shelters if they could not be safely returned to a hangar. The Russian's reported that one of their bedded down airships (SSSR V2, on bivouac) tore loose from sixty "corkscrew" ground anchors and was blown away on Sep. 6, 1935.

Since the development of the mooring mast shortly after World War I, nearly all American airships have been designed to operate from a fixed or mobile mooring mast. Typically, the airship is ballasted to near-neutral buoyancy, connected to the mast by a fitting at its nose, and allowed to weathercock around the mast. High winds or unexpected wind shifts and gusting, while the airship is attached to a mooring mast, or while groundhandling crews are moving the airship, continue to be primary causes of airship losses and accidents.

An airship's lines, ropes and/or cables may be manhandled, fastened to powered winches on land or specially modified ships or heavy vehicles or attached to fixed and drifting anchors. Airship and aerostat lines have been used to carry electrical power, water, gas, telegraph, telephone, analog and digital electronic signals and electro-optical signals between the ground and the buoyant device. Airship's winches have been used to tow boats and sonar-bodies, to transfer passengers, and to pick up other loads from the ground and the sea. However, as previously mentioned, except for the barrage balloon, no applications were designed to control or use the space between the balloon and the earth, except to protect and secure the LTA device itself.

What has not been developed is a system and method to control the space between the earth and the LTA device. What is further needed is a means of controlling the height, orientation and disposition of the system as well as rapid retrieval and stowage at the onset of severe weather or whenever the operator needs to deactivate the system for some other reason.

Rather than using a mooring mast, or multiple lines to constrain and control the LTA device, this invention employs a flexible distributed surface, a surface which in addition to restraining and controlling the LTA device also performs, inter alia, one or more of the following useful functions: blocks light; screens, filters, and/or blocks airflow; collects and condenses aerosols; blocks or stops larger airborne particles, bugs and birds.

SUMMARY OF THE INVENTION

It is an object of this invention to provide a working surface to limit and control the movement of air between an LTA element and the earth beneath it.

It is another object of this invention to provide a working surface to limit and control the movement of objects or materials in the air between an LTA element and the earth beneath it.

It is still another object of this invention to provide a method and system to limit or control light and other radiation effects through this working surface.

It is still yet another object of this invention to provide a method and system for rapid erection and relocation of an extremely lightweight, large wall or curtain over/around virtually unprepared terrain or water surfaces.

The present invention uses an LTA device, non-limiting examples of which include balloons, aerostats or airships, to support the upper end of one or more extended working surfaces between the device and the ground or the sea. In most applications the device will be operating at very low altitudes (the working surface less than 500 feet in height) and operating in light winds (less than 15 knots). Consequently the LTA device's design and strength requirements are considerably relaxed vis-à-vis conventional airships and aerostats.

The working surface may be built as a part of the balloon structure, or may be designed for rapid attachment/detachment and replacement. Suitable materials for the surface range from impermeable fabrics to open web nets, depending upon the intended application. The working surface may be opaque, transparent, or translucent. The surface may be created as a unitary fabric or assembled by connecting multiple segments of similar or dissimilar fabrics. An individual working surface may incorporate embedded or attachable power and signal lines, special tensile strength members and attachment points, such as eyelets or "Velcro" pads.

In some applications more than one such surface may be supported by the same LTA element and connected to separate ground attachments. In other applications, surfaces may be arranged as a cascade, between two or more buoyant balloons or airships.

Applications include, inter alia: fog clearing/harvesting; air dam/wind break; turning vane for windmills; stirring vane for frost prevention; sail, primary or secondary ship propulsion; and various mechanical and visual barrier (filter, screen, fence and reflector) applications.

As a fog harvester, the present invention works best under calm or light wind conditions. The large exposed surface and its supporting balloon, with or without additional cooling, efficiently condenses and collects airborne aerosols. If there is insufficient wind, or if the purpose is to clear fog from a specific area, such as an airport runway, the entire assembly can be propelled against the wind down the entire length of the runway.

In another application, the invention can be attached as a segmented skirt, connecting a low-tethered balloon, such as the Lindstrand HiFlyer, which uses an eighteen cable tie-down system. The HiFlyer would then resemble a large inverted cone, but serve as an extremely large tent.

In its simplest application, the invention consists of a single flexible film, attached at intervals to the bottom of a cylindrical LTA balloon by its strength members (cables, cords or reinforcing tape or webbing), and also attached at its bottom to hard points on the ground, thus forming a surface in tension as a result of the lifting force of the balloon. Guys, at one or both ends of the balloon may be used to orient the balloon and thus the surface to the wind, or the balloon might be left free to respond to the wind's force and be tethered only through the working surface.

The balloon may be parallel to the ground or it may be adjusted to an arbitrary angle, as in a lateen sail. The ground attachments may be in a straight line, in an arc, or any other desired configuration to control the orientation of the surface and/or to adjust the area of the working surface exposed to the sun and/or wind.

For illustrative purposes, consider a two hundred foot long cylindrical balloon, twenty feet in diameter. Such a balloon filled with approximately 62,000 cubic feet of helium, would provide a gross lift of roughly 20 pounds per foot of length (about 10 pounds per foot if filled with methane). Under calm conditions, the working surface, a "curtain" rising from ground level to the balloon would present a nearly vertical surface. Under light wind conditions, or when the base is moved relative to the earth, the force of the apparent wind against the curtain will drive the balloon to windward, until the buoyancy, gravity, inertia, and wind forces reach an equilibrium.

In general, the present invention provides an LTA device comprising, a buoyant element containing LTA gas, and a flexible surface having a length and height forming a usable area, the length of the flexible surface being connected directly to the buoyant element, wherein the flexible surface is operable to use an area defined by the buoyant element and line below the flexible surface.

In general, the present invention further provides a method of condensing water comprising, inflating an element with sufficient LTA gas to lift the element and at least a portion of a flexible surface, the flexible surface having a length and height forming a usable area connected directly to the buoyant element, off the ground, and controllably moving the inflated buoyant element and the flexible surface through the air, wherein water condenses on the buoyant element and drips down the flexible surface.

The present invention still further provides a method of powering a vessel, in favorable winds, by using the working surface as a sail secured to the vessel, the sail having length and height and being connected directly to the buoyant element, and inflating the element with sufficient LTA gas to lift the element and at least a portion of the sail off the vessel, wherein wind force pushes the sail and therefore moves the vessel.

The present invention yet further provides a method of blocking material from entering an area, securing a flexible surface to a perimeter of the area, the flexible surface having a length and a height and being connected directly to an element, and inflating the element with sufficient LTA gas to lift the element and at least a portion of the flexible surface off the ground, wherein flexible surface lifted by the inflated element prevents material from entering the area. In one embodiment, the material blocked from entering the area is turbulent air. In another embodiment, the material blocked from entering the area is fog. In yet another embodiment, the material blocked from entering the area includes liquid or solid objects, such as insects.

Additional advantages of the present invention will become apparent to those skilled in the art from the following detailed description of exemplary embodiments of the present invention. The invention itself, together with further objects and advantages, can be better understood by reference to the following detailed description and the accompanying drawings.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings:

FIG. 1 depicts an exemplary embodiment of a LTA device in accordance with the present invention.

FIG. 2 depicts another exemplary embodiment of a LTA device in accordance with the present invention.

FIG. 10 illustrates an exemplary system and method for assembling the winding bar of FIG. 7 with left cross bar.

FIG. 11 illustrates an exemplary system and method for assembling the winding bar of FIG. 7 with right cross bar.

DETAILED DESCRIPTION OF THE INVENTION

Figure 3A:
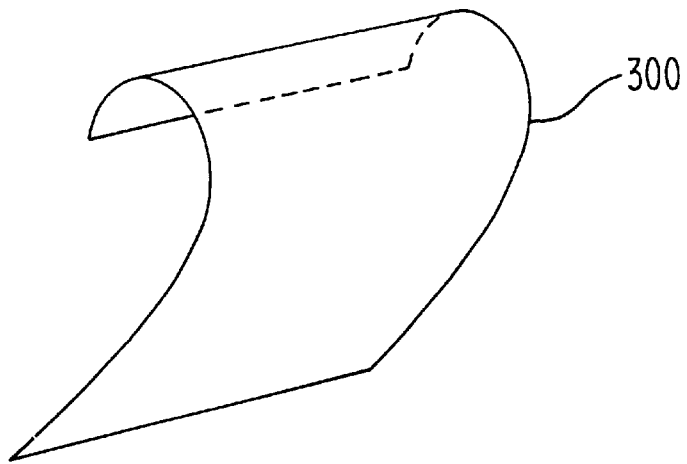
FIGS. 3A–3C illustrate an exemplary method of manufacturing a LTA device in accordance with an embodiment of the present invention.

In the following description, for the purposes of explanation, numerous specific details are set forth in order to provide a more thorough understanding of the present invention. It will be apparent, however, to one skilled in the art that the present invention may be practiced without these specific details.

FIG. 1 depicts an exemplary embodiment of a LTA device in accordance with the present invention. In FIG. 1, LTA device 100 includes buoyant element 102 containing a LTA gas, and a flexible surface 104. Seam 106 runs along the length of buoyant element 102, whereas seams 108 and 110 runs along the height of buoyant element 102.

As for the shape of the element, for the same reasons as applied to conventional LTA devices, a sphere is the most efficient shape, i.e., it encloses the greatest volume with the least surface area. It is noted that a spherically shaped LTA device may practically be considered only in the academic sense. In particular, an LTA device must respond to several forces, and corresponding moments. Non-limiting examples of forces include gravity, buoyancy, thrust, and pressure, whereas the corresponding non-limiting examples of moments include the moments which act upon the center of gravity, center of buoyancy, center (or axis) of thrust, and center of pressure, respectively. Unfortunately, the vector quantities (Weight, Buoyancy, Thrust, and Aerodynamic lift and drag) are never co-located, and all are capable of fairly large changes in location and magnitude over relatively short periods of time.

Consequently, an LTA device that is generically termed "spherically shaped," is not in actuality in the shape of a sphere. More specifically, as a result of the external forces and moments acting upon the LTA device, the shape is distorted, so as not to resemble a sphere. However, the terms "sphere" and "spherical" are used herein to describe an LTA device that would be a sphere, absent the effect of external forces and moments.

Similarly, for the same reasons as applied to conventional LTA devices, a simple cylindrical, or tubular, balloon of equal volume may be lighter than a spherical balloon as a result of fewer seams. Further, for the same reasons as described above with respect to a spherical LTA, a cylindrical or tubular LTA may not have, in actuality, the shape of a cylinder or tube, respectively. However, the terms "cylindrical" and "tubular" are used herein to describe an LTA device that would be a cylinder or tube, absent the effect of external forces and moments.

Of course, most any shape element may be used for an LTA device in accordance with the present invention, so long as its size and shape permit sufficient lift for the element itself in addition to the flexible material attached thereto.

The flexible material may be created as a unitary fabric or assembled by connecting multiple segments of similar or dissimilar fabrics. An individual working surface may incorporate embedded or attachable power and signal lines, special tensile strength members and attachment points, such as eyelets or "Velcro" pads.

As for the flexible material, the types, sizes, shapes, and other characteristics of materials may be chosen depending on the intended use of the LTA device Non-limiting examples of materials that may be used in accordance with the present invention include existing gas tight fabrics such as those used in the present generation of airships and aerostats. The sizes and shapes of flexible materials of a LTA device in accordance with the present invention may be chosen to fit design parameters commensurate with the designed lift of the buoyant element. Non-limiting examples of characteristics of materials to be considered when choosing the flexible materials of a LTA device in accordance with the present invention include density, tensile strength, elasticity, reflectance, transparency, opacity, color, cost, and durability in field service.

As described above, the choice of the material for the flexible material of the LTA device in accordance with the present invention may be dependent, among other things, upon the intended use of the LTA device. For example, for use as a fog harvester, a porous material having proficient hydrophobic properties should be chosen, so as to permit the condensed water to drip down the flexible surface to a water collector at the bottom. For use as an air dam/wind break, a material with high tensile strength and low elasticity may be chosen so as to be sturdy without stretching under the wind force. For use as a turning vane for windmills, as a stirring vane for frost prevention, or as a sail, primary or secondary ship propulsion, the material should be highly flexible so that it can be folded and stowed for extended periods without damage. For use as a visual barrier (e.g. a privacy screen or alternatively a movie screen) a material may be chosen having a desired reflectance, transparency, opacity, and color. For use as various mechanical barriers, a material may be chosen having a desired filtration ability in light of the particulate to be filtered; a porous membrane for filtering vapor or small pollen and dust particles, a screen for larger items such as bugs, leaves and construction debris, and netting for birds and large items.

FIG. 2 depicts another exemplary embodiment of a LTA device in accordance with the present invention. In FIG. 2, LTA device 200 includes buoyant element 202 having two end faces 208 and 210 and containing an LTA gas, and a flexible surface 204. Seam 206 runs along the length of buoyant element 202, whereas seams 212 and 214 runs along the circumference of each respective end face 208 and 210.

Figure 3B:
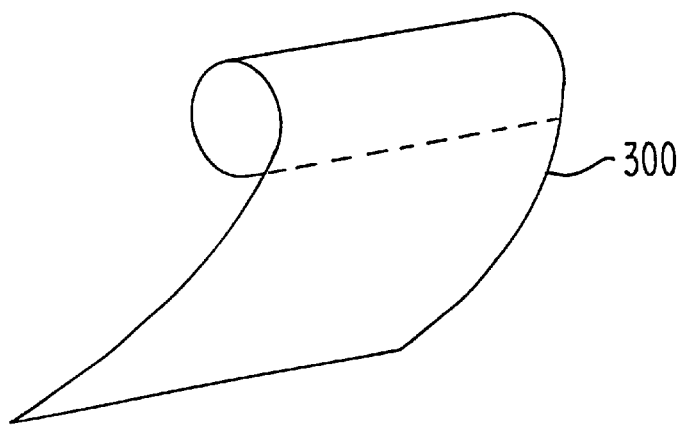
Figure 3C:
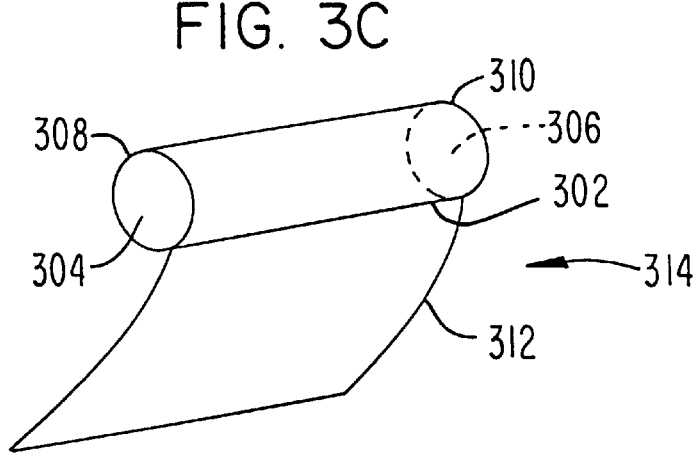

FIGS. 3A–3C illustrate an exemplary method of manufacturing a LTA device in accordance with an embodiment of the present invention.

A top portion of sheet 300 of material, as depicted in FIG. 3A, is rolled onto itself to form a tubular element, as depicted in FIG. 3A. Sheet 300 may be a unitary piece of material. Alternatively, Sheet 300 may be a composition of a plurality of segmented pieces attached together by known methods, non-limiting examples of which include sewing, buttons, pressure sensitive adhesives, thermo-sensitive adhesives, etc. As for the composition of sheet 300, many materials may be used, limited by factors such as their respective density, cost, and availability, in addition to their respective characteristics pertaining to a particular intended use as will be described further below.

Once the top portion of sheet 300 is rolled onto itself, it may be attached along a seam 302. The seam 302 may be created by known methods, non-limiting examples of which include sewing, buttons, pressure sensitive adhesives, thermo-sensitive adhesives, etc. End portions 304 and 306, which may or may not be comprised of a material different than that of sheet 300, may then be attached to both open ends of the rolled top portion of sheet 300 by known methods along respective seams 308 and 310. A device 314 is thus produced, comprising element 306 and flexible surface 312.

In the embodiment of FIG. 1, end portions are not attached to both open ends of the rolled top portion of the sheet. Alternatively, in this embodiment, the end portions of the rolled top portion of the sheet are closed with seams 108 and 110 by known methods.

Non-limiting examples of other methods of attaching the flexible material to the element, as opposed to direct attachment, include remote attachment with lines, chains, netting, etc.

Figure 4:
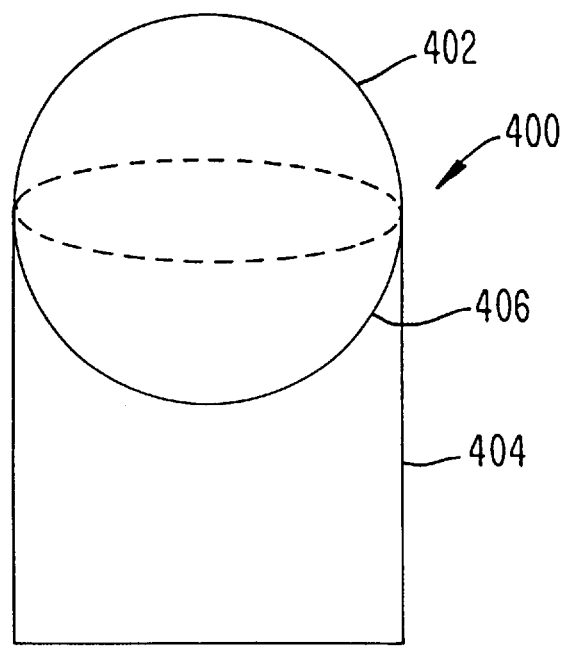
FIG. 4 depicts yet another exemplary embodiment of a LTA device in accordance with the present invention.

FIG. 4 depicts yet another exemplary embodiment of a LTA device in accordance with the present invention. Specifically, FIG. 4 illustrates how a preexisting LTA device may be modified include a usable flexible surface in accordance with the present invention. In FIG. 4, LTA device 400 includes; spherical balloon 402 containing a LTA gas, and a flexible surface 404. Seam 406 runs along the lower perimeter of buoyant element 402.

Figure 5:
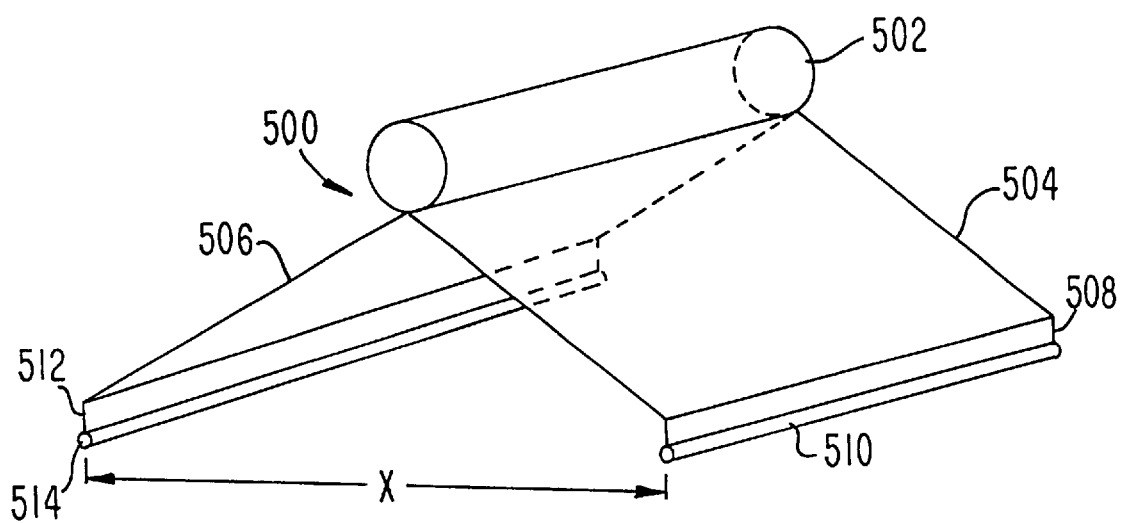
FIG. 5 depicts yet another embodiment of LTA device in accordance with the present invention in which a plurality of flexible surfaces are attached to element.

FIG. 5 depicts yet another embodiment of LTA device 500 in accordance with the present invention in which a plurality of flexible surfaces 504 and 506 are attached to element 502. Anchors 510 and 514 are attached to respective flexible surfaces 504 and 506 by lines 508 and 512, respectively. As such, flexible surfaces 504 and 506 may be disposed at a desired distance X, thereby providing a floating enclosure for containing flow of materials such as wind or artificial snow from a snow making machine. Furthermore, the LTA device 500 may be moved, while retaining its shape, by moving the anchors such as by towing each with a vehicle.

Further applications of a LTA device in accordance with the present invention will now be discussed.

Figure 6:
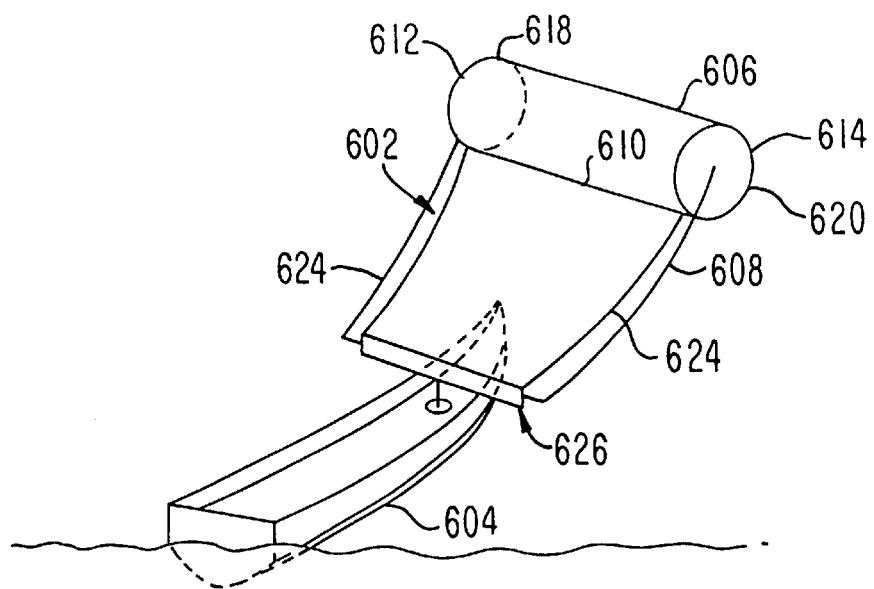
FIG. 6 depicts an exemplary method of using a LTA device in accordance with the present invention as a mastless sail for a boat.

FIG. 6 depicts an exemplary method of using a LTA device in accordance with the present invention as a mast-less sail for a boat. In FIG. 6, LTA device 602 includes; element 606 containing a LTA gas, and a flexible surface 608, wherein the LTA device 602 attached to the deployment rigging 626, which is pivotally mounted to boat 604. Seam 610 runs along the length of buoyant element 606, whereas seams 618 and 620 runs along the circumference of each respective end face 612 and 614. Control lines 622 and 624 may optionally be added to inhibit twisting of the element 606 relative to the deployment rigging 626.

In operation as a mast-less sail, as exemplified in FIG. 6, first the element 606 must be inflated with a LTA gas. Once inflated, the buoyancy of element 606 enables deployment of the mast-less sail, which will be discussed in detail below.

Figure 7:
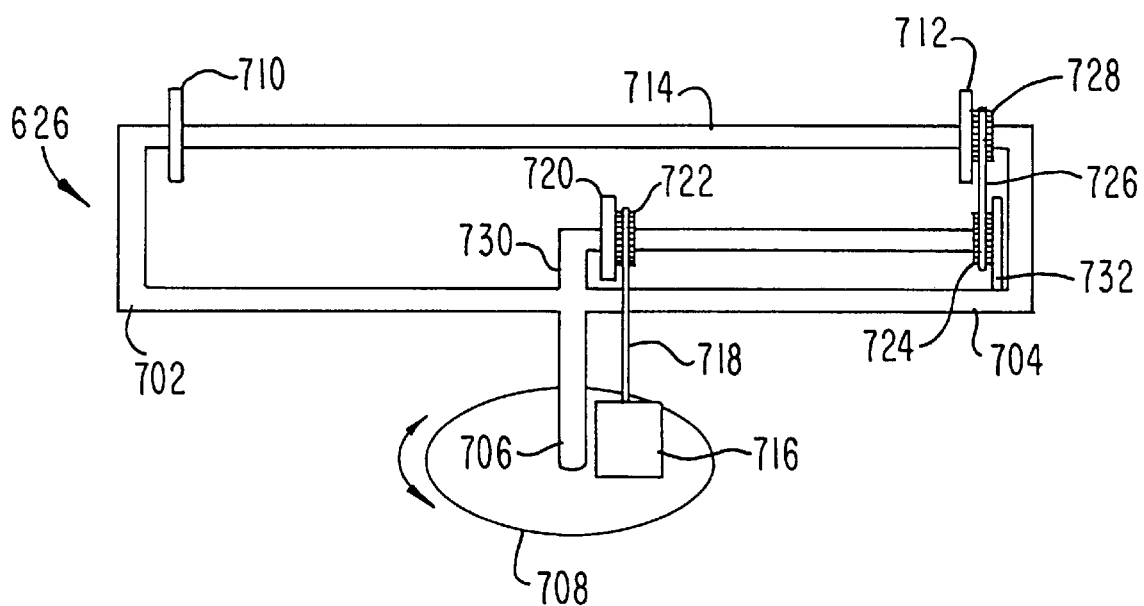
FIG. 7 depicts an exemplary deployment rigging to be used with boat having a LTA device in accordance with the present invention.

FIG. 7 depicts an exemplary deployment rigging to be used with boat having a LTA device in accordance with the present invention. The deployment rigging 626 includes left and right crossbars 702 and 704 respectfully, meet at a T-section 706, which is mounted into rotatable base plate 708, which is fastened into the deck of the boat. Winding bar 714 is rotatably mounted between crossbars 702 and 704. End plates 710 and 712, concentrically mounted to the winding bar 714, assure even retracting and deploying of the flexible material. Gear 728, additionally concentrically mounted to winding bar 714, is meshed with chain 726. Motor 716 provides power to turn the winding bar 714 in either one of a retracting and deploying direction. A manual crank may be used in place of motor 716. The power transmission system includes chain 718, receiving gear 722, transfer bar 720, gear 724 and chain 726. The transfer bar 720 is mounted to crossbar 704 by support members 730 and 732.

In operation, motor 716 drives chain 718 to rotate transfer bar 720 via gear 722. The rotation of transfer bar 720, and consequently gear 724, drives chain 726, which then rotates winding bar 714, via gear 728, to thereby retract or deploy the flexible material. Motor 716 thus fully deploys or detracts the flexible material, thereby raising or lowering the mast-less sail Once deployed, the mast-less sail may be steered by rotating the rotatable base plate 708, such as with a controllable motor (not shown).

Figure 8A:
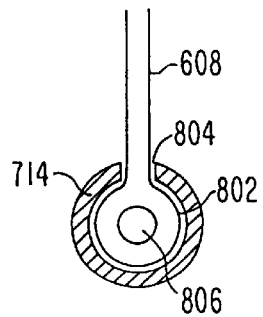
FIG. 8A is a cross-sectional view of the winding bar of FIG. 7 with the flexible material mounted therein and fully deployed.
Figure 8B:
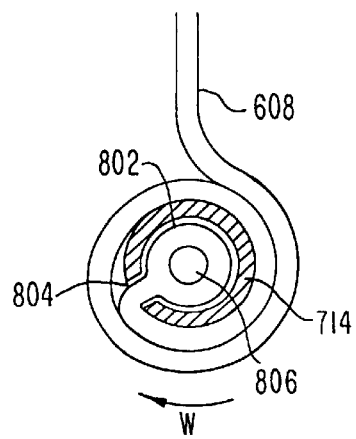
FIG. 8B is a cross-sectional view of the winding bar of FIG. 7 with the flexible material mounted therein, after the winding bar of FIG. 7 has been rotated in a direction w, for a time t.

FIG. 8A is a cross-sectional view of the winding bar 714 with the flexible material 608 mounted therein and fully deployed. As seen in FIG. 8A, the flexible material includes an end 802, which contains a member 806, wherein circumference of end 802 is too large to pass through slit 804 in the winding bar 714. FIG. 8B is a cross-sectional view of the winding bar 714 with the flexible material 608 mounted therein, after the winding bar 714 has been rotated in a direction w, for a time t.

Figure 9:
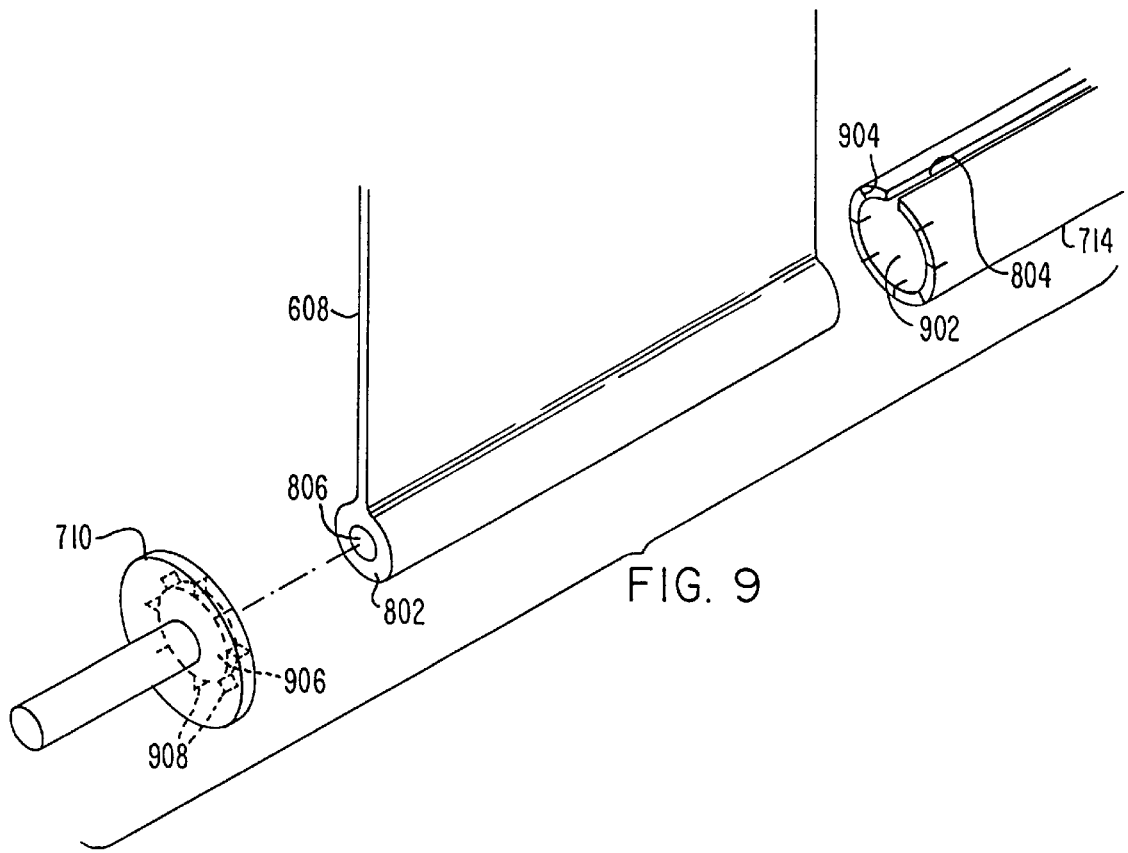
FIG. 9 illustrates an exemplary system and method for assembling the flexible material with the winding bar of FIG. 7.

FIG. 9 illustrates an exemplary system and method for assembling the flexible material 608 with the winding bar 714. As illustrated in FIG. 9, endplate 710 is removeably mounted to winding bar 714 via a collar 906, that contains projections 908 that slidably mate with slots 904 in winding bar 714. As a result of the mated connection of projections 908 and the slots 904, as the winding bar 714 rotates, endplate 710 additionally rotates. Endplate 710 additionally includes mounting bar 910 to be mounted into left crossbar 702. With endplate 710 removed from winding bar 714, the flexible material 608 may be inserted into winding bar 714 by guiding the end 802 into inlet 902 such that the remainder of the flexible material may slide along slit 804. Once the flexible material 608 is inserted into the winding bar 714, endplate 710 is remounted to contain the flexible material 608 therein.

FIG. 10 illustrates an exemplary system and method for assembling the winding bar 714 with left cross bar 702. As illustrated in FIG. 10, the end of crossbar 702 includes a locking latch portion 1002, having a receiving groove 1004 therein. Although a locking mechanism is not shown, any known locking mechanism may be used. Once latch portion 1002 is opened, mounting bar 910 of endplate 710 may be inserted to rest on a groove 1004 located therein. A second groove, not shown, formed in the non-latch portion of the end of crossbar 702 additionally receives the mounting bar 910 when the latch portion is closed. Of course, various lubricants, bearings, or other friction reducing mechanisms may be used at the junction of the left cross bar 702 and endplate 710, in order to decrease friction and permit smooth rotation of the winding bar 714.

FIG. 11 illustrates an exemplary system and method for assembling the winding bar 714 with right cross bar 704. As illustrated in FIG. 11, the end of crossbar 704 includes a locking latch portion 1104, having a receiving groove 1106 therein. Although a locking mechanism is not shown, any known locking mechanism may be used. Once latch portion 1104 is opened, mounting bar 1102 of endplate 712 may be inserted to rest on a groove 1104 located therein. A second groove, not shown, formed in the non-latch portion of the end of crossbar 704 additionally receives the mounting bar 1102 when the latch portion is closed. Of course, various lubricants, bearings, or other friction reducing mechanisms may be used at the junction of the left cross bar 704 and endplate 712, in order to decrease friction and permit smooth rotation of the winding bar 714.

In the exemplary embodiment of the winding bar as described above with reference to FIGS. 10–11, the winding bar is loaded into the crossbars in a direction between the direction facing down and a direction facing the rear of the boat. This loading direction is chosen to maximize the integrity of the latches in the crossbars retain the winding bar. More specifically, the buoyancy of the mast-less sail will produce a force pulling the winding bar in a direction up from the deck of the ship, while the wind will produce a force pulling the winding bar in a direction toward the front of the ship. As such, the exemplary embodiment of the present invention provides the integral portion of the end of the crossbars to withstand such pulling forces, whereas the latches in the crossbars merely retain the winding bar. However, the latches may be provided in any position of the crossbar in order to provide numerous winding bar mounting designs.

Deployment of an LTA device is not limited to the exemplary embodiment as described above with respect to FIGS. 7–11. On the contrary, any deployment and corresponding retrieval technique known in the sailing industry may be used. A non-limiting example of which includes reefing.

In another exemplary method of using an LTA device in accordance with the present invention as a mast-less sail. For example, the combination of element and flexible surface is mounted to the port or starboard side of the vessel. In particular, one end of the flexible surface is fastened to the vessel. Non-limiting examples of means for fastening may include a plurality of lines and individually controlled winches, or any other known spar, boom, or sail deployment system. The other end of the flexible surface is connected to the element as described, for example, above. Mounting the LTA device along the hull of the ship lowers the applied force and reduces the healing moment, over that of conventional mast-sail systems. Furthermore, such a use of an LTA device in accordance with the present invention may be employed to propel other objects through fluids.

Figure 12:
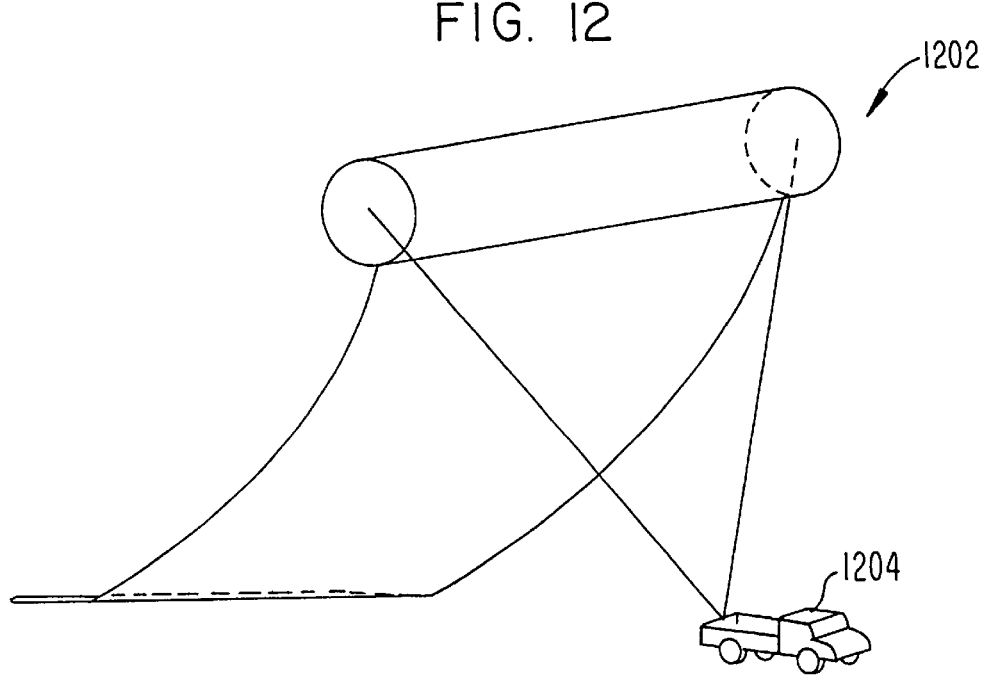
FIG. 12 illustrates the application of a LTA device in accordance with the present invention as a fog harvester.

In another application, for example as a fog harvester, an LTA in accordance with the present invention may work best under calm or light wind conditions. The large exposed surface and its supporting balloon, with or without additional cooling, efficiently condenses and collects airborne aerosols. If there is insufficient wind, or if the purpose is to clear fog from a specific area, such as an airport runway, the entire assembly 1202 can be propelled against the wind down the entire length of the runway, for example by way of towing from a vehicle 1204, as illustrated in FIG. 12.

Figure 13:
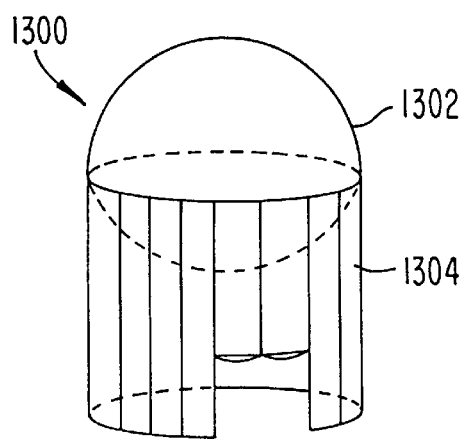
FIG. 13, illustrates the application of a LTA device in accordance with the present invention as a "tent."
Figure 14:
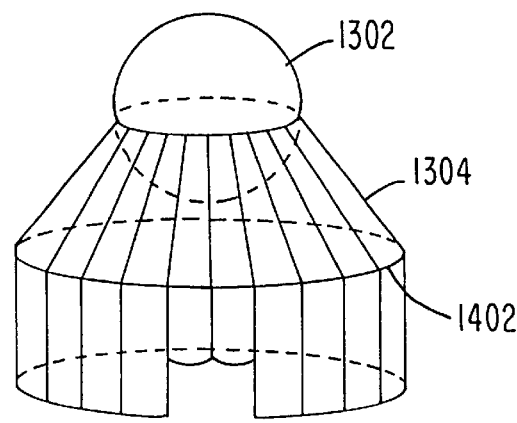
FIG. 14 illustrates a modified version of the application of a LTA device of FIG. 13.

In another application, as illustrated in FIG. 13, an LTA 1300 in accordance with the present invention includes a low-tethered (Low-Tethered as differentiated from high tethered . . . fastened close to the ground.) balloon 1302 having an attached segmented skirt 1304, wherein the LTA 1300 may be used as a tent. FIG. 14 illustrates a modification of the LTA device of FIG. 13, wherein a displacement ring 1402 is provided to increase the usable area under the low-tethered balloon 1302.

Although certain specific embodiments of the present invention have been disclosed, it is noted that the present invention may be embodied in other forms without departing from the spirit or essential characteristics thereof The present embodiments are therefor to be considered in all respects as illustrative and not restrictive, the scope of the invention being indicated by the appended claims, and all changes that come within the meaning and range of equivalency of the claims are therefore intended to be embraced therein.

What is claimed is:

1. A lighter-than-air device operable to float above a reference surface, said lighter-than-air device comprising:
   a buoyant element containing an amount of lighter-than-air gas; and
   a flexible surface having a length and height forming a usable area, said flexible surface having a top edge connected directly to said buoyant element and a bottom edge that is not connected to said buoyant element,
   wherein said usable area of said flexible surface is bounded above by said buoyant element and bounded below by one of said bottom edge of said flexible surface and the reference surface,
   wherein said amount of lighter-than-air-gas is sufficient to lift said buoyant element and a portion of said flexible surface above the reference surface,
   wherein said flexible surface comprises multiple segments, and
   wherein said multiple segments comprise a first segment of a first material and a second segment of a second material.

2. A lighter-than-air device operable to float above a reference surface, said lighter-than-air device comprising:

a buoyant element containing an amount of lighter-than-air gas; and a flexible surface having a length and height forming a usable area, said flexible surface having a top edge connected directly to said buoyant element and a bottom edge that is not connected to said buoyant element, wherein said usable area of said flexible surface is bounded above by said buoyant element and bounded below by one of said bottom edge of said flexible surface and the reference surface, wherein said amount of lighter-than-air-gas is sufficient to lift said buoyant element and a portion of said flexible surface above the reference surface, wherein said flexible surface comprises a bottom edge that is attachable to the reference surface.

* * * * *